No. 865,072. PATENTED SEPT. 3, 1907.
I. ABBOTT.
VEHICLE WHEEL.
APPLICATION FILED JAN. 7, 1907.

WITNESSES:
Oliver C. Barthel
Anna M. Dorr

INVENTOR
Ira Abbott
By Barthel Barthel
Attorneys

UNITED STATES PATENT OFFICE.

IRA ABBOTT, OF WYANDOTTE, MICHIGAN.

VEHICLE-WHEEL.

No. 865,072.  Specification of Letters Patent.  Patented Sept. 3, 1907.

Application filed January 7, 1907. Serial No. 351,040.

*To all whom it may concern:*

Be it known that I, IRA ABBOTT, a citizen of the United States of America, residing at Wyandotte, in the county of Wayne and State of Michigan, have invented certain new and useful Improvements in Vehicle-Wheels, of which the following is a specification, reference being had therein to the accompanying drawings.

This invention relates to improvements in vehicle wheels and more especially to wheels in which springs are employed to give the necessary resiliency, and the object of the invention is to provide a wheel in which springs connecting the hub and rim are so formed that they are readily flexed in any direction thus making a very resilient wheel, and so shaped that the strain put upon them by the force applied to the hub to turn the wheel when said wheel is used upon a motor vehicle, will not tend to straighten or break the springs.

The invention also consists in providing suitable means for securing the springs to make a rigid and durable construction and to permit of their ready removal if broken, and further, to provide certain other new and useful features, all as hereinafter more fully described and shown in the accompanying drawing in which:—

Figure 1:
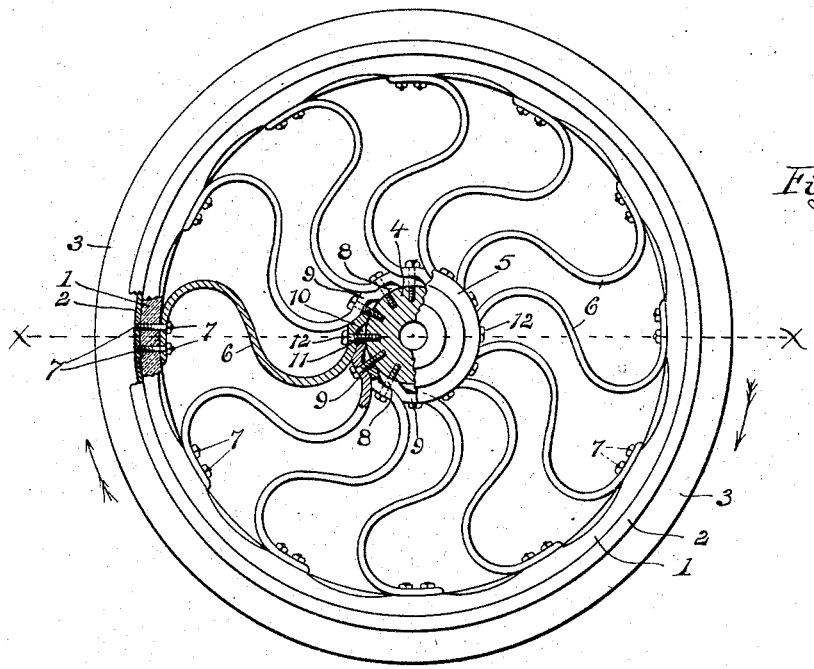
Figure 2:
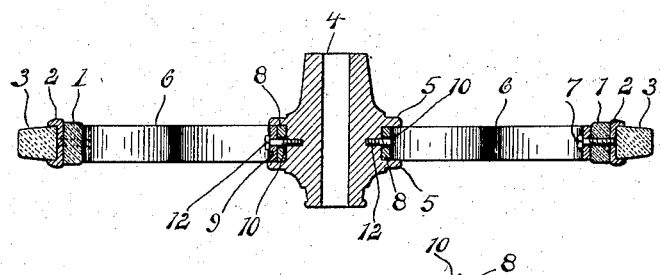
Figure 3:
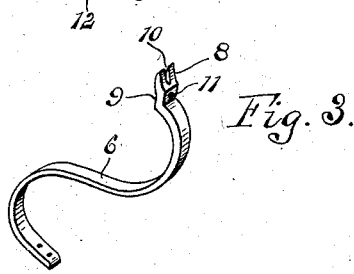

Figure 1 is a side elevation of a wheel embodying the invention, with parts broken away to show the construction; Fig. 2 a transverse section of the same on the line $x$—$x$; and Fig. 3 is a perspective view of one of the springs detached.

As shown in the drawing 1 represents a wooden rim of any desired construction having secured thereto a flanged metal tire 2 for engaging and holding the solid rubber tire or tread 3. A hub 4 of any suitable form and construction is provided with outwardly projecting parallel flanges 5 forming between them a groove to receive the inner ends of a series of S-shaped springs 6, the outer ends of said springs being secured to the wooden rim by bolts 7 passing through openings in the ends of said springs and openings in the wood rim, and screwed into screw-threaded openings in the metal tire.

The inner ends of the springs are of a width to fit closely between the flanges 5 and are thus held from movement laterally of the wheel, and each is formed with a short curved end portion 8 to seat upon the bottom of said groove between the flanges and with an outward bend or offset 9 to seat upon the end portion 8 of the next adjacent spring. The end portion 8 of each spring is formed with a slot 10 extending inward from its end and with a hole 11 which when the springs are in place will be opposite the slot in the end of the next spring which is beneath its offset. Bolts 12, passing through said holes and slots and engaging screw-threaded holes in the hub, firmly secure the springs to the hub and permit of any one of the springs being readily detached, should it become broken, by taking out the bolt which passes through the broken spring and loosening the bolt holding the next spring to release the end of the broken spring which end is clamped by said spring. By overlapping the springs in this manner, each is firmly held by a single bolt.

The wheel is preferably attached to the vehicle so that in traveling ahead, it will turn in the direction indicated by the arrows so that the outer ends of said springs will extend forwardly at the lower side of the wheel and thus have less tendency to catch and throw mud, dust and dirt. A very resilient wheel is secured by the use of the S-shaped springs as they yield quite as readily in a lateral direction as longitudinally and when the wheel is used as one of the driving wheels of a motor vehicle, the power applied to the hub by the motor does not tend to straighten out or wind the springs around the hub as the curve at one end of the spring forms a brace or support to sustain the curve or loop at the opposite end.

Having thus fully described the invention what I claim is:—

1. In a vehicle wheel, the combination with a rim and a hub, of outwardly extending flanges on the hub forming a groove between, S-shaped springs secured at their outer ends to the rim and having their inner ends overlapped within the groove, and bolts passing through the overlapped ends of the springs to secure the same to the hub.

2. In a vehicle wheel, the combination with a rim and a hub, of a series of S-shaped springs secured to the rim at their outer ends and each having an end portion to seat upon the hub and an offset adjacent to said portion to seat upon the end portion of the next adjacent spring, and bolts extending through openings in the end portions and offset portions to secure the ends to the hub.

3. In a vehicle wheel, the combination with a rim and a hub, of outwardly extending parallel flanges on the hub forming a groove between, a series of S-shaped springs secured at their outer ends to the rim and formed at their inner ends with end portions to fit between the flanges and seat upon the bottom of the groove, said end portions being provided with slots extending inward from their ends and said springs being each also formed with an outward offset adjacent to its end portion to seat upon the end portion of the next adjacent spring and formed with a hole opposite the slot in said end of said adjacent spring, and bolts passing through said holes and slots and engaging screw-threaded openings in the hub.

In testimony whereof I affix my signature in presence of two witnesses.

IRA ABBOTT.

Witnesses:
 OLIVER E. BARTHEL,
 OTTO F. BARTHEL.